(12) United States Patent
Furnival

(10) Patent No.: US 7,681,865 B2
(45) Date of Patent: Mar. 23, 2010

(54) BALL VALVE

(75) Inventor: Craig Antony Furnival, Cheshire (GB)

(73) Assignee: Oliver Twinsafe Valves Limited, Cheshire (GB)

( * ) Notice: Subject to any disclaimer, the term of this patent is extended or adjusted under 35 U.S.C. 154(b) by 486 days.

(21) Appl. No.: 11/280,034

(22) Filed: Nov. 16, 2005

(65) Prior Publication Data

US 2007/0251577 A1 Nov. 1, 2007

Related U.S. Application Data

(63) Continuation of application No. PCT/GB2004/000856, filed on Mar. 3, 2004.

(51) Int. Cl.
*F16K 5/06* (2006.01)

(52) U.S. Cl. .............. 251/315.14; 251/293; 251/315.01

(58) Field of Classification Search ................................. 251/315.01–315.16, 292
See application file for complete search history.

(56) References Cited

U.S. PATENT DOCUMENTS

| | | | | |
|---|---|---|---|---|
| 1,784,381 A | * | 12/1930 | O'Stroske | 137/315.19 |
| 3,077,895 A | * | 2/1963 | Vickery | 251/315.14 |
| 3,112,758 A | | 12/1963 | Norton | |
| 3,179,121 A | * | 4/1965 | Bredtschneider et al. | 137/454.6 |
| 3,277,919 A | | 10/1966 | Piccardo | |
| 3,515,371 A | * | 6/1970 | Jones, Jr. et al. | 251/214 |
| 3,705,707 A | * | 12/1972 | Scaramucci | 251/315.08 |
| 4,023,773 A | * | 5/1977 | Wise | 251/148 |
| 4,174,090 A | * | 11/1979 | Nelimarkka | 251/315.08 |
| 4,206,904 A | * | 6/1980 | Dante | 251/315.14 |
| 4,678,161 A | | 7/1987 | Bando et al. | |
| 5,145,150 A | * | 9/1992 | Brooks | 251/315.12 |
| 5,263,685 A | * | 11/1993 | Winnike et al. | 251/315.01 |
| 5,417,405 A | * | 5/1995 | Stephan et al. | 251/315.16 |

FOREIGN PATENT DOCUMENTS

| | | |
|---|---|---|
| CN | 2305529 Y | 1/1999 |
| DE | 33 33 116 A1 | 4/1985 |
| DE | 38 30 615 A1 | 3/1990 |
| EP | 0 133 092 A1 | 2/1985 |
| EP | 0 178 344 A1 | 4/1986 |

\* cited by examiner

*Primary Examiner*—John Rivell
*Assistant Examiner*—Andrew J Rost
(74) *Attorney, Agent, or Firm*—Krieg DeVault LLP

(57) ABSTRACT

A ball valve assembly comprises a housing with ball valve rotatably disposed in a valve chamber in the flow passage. The ball valve is rotatable between open and closed positions by a valve stem that is connected to the ball valve at one end. The ball valve has an open ended slot in which the end of the stem is received. During assembly the stem may be inserted into the housing first and then the ball valve introduced into the housing with the slot facing the stem and then moved in the direction of the slot so that that the stem is received in the slot. The arrangement enables the conventional bonnet in a ball valve assembly to be eliminated and therefore provides for a compact design.

25 Claims, 2 Drawing Sheets

BALL VALVE

CROSS REFERENCE TO RELATED APPLICATIONS

The present application is a continuation of International PCT Application No. PCT/GB2004/000856, filed Mar. 3, 2004 and published in English on Nov. 25, 2004 as International Publication No. WO 2004/102048, which claims foreign priority benefit of British Patent Application No. 0311283.6, filed May 16, 2003, the entire contents of each application hereby incorporated by reference in their entirety.

FIELD OF THE INVENTION

The present invention relates to a ball valve assembly and particularly to such a valve assembly for use in pipelines or other conduits.

BACKGROUND

In ball valve assemblies designed for use with relatively high pressure fluids (i.e., gases or liquids) a ball valve is generally supported for rotation in a valve housing by at least one trunnion that extends through the housing into the valve chamber. In many designs the ball valve is actuated between open and closed positions via a rotary spindle (or stem) that extends through a bore in the valve housing and into the ball.

The other end of the spindle extends out of the housing where it is connected to an actuator such as a lever or a motor. The spindle is supported in the housing bore by a bonnet that is fastened to the housing exterior. The bonnet serves to retain the spindle in the housing and generally has a lower surface that is designed to abut an anti-blowout shoulder on the spindle. The abutment of the shoulder and the bonnet surface prevent significant movement of the spindle out of the housing.

A ball valve assembly of this kind is assembled by inserting the components in a certain sequence. Typically one of the valve seats is first inserted into the valve chamber followed by the ball valve and then the opposite seat. The trunnion is fitted into the ball through an aperture in the housing and then spindle and bonnet are inserted into the bore together. The end of the spindle is received in a socket in the ball valve and the bonnet is then fastened securely to the outside of the housing.

There remains a need for an improved ball valve assembly and a method for assembling a ball valve assembly. The present invention satisfies this need and provides other benefits and advantages in a novel and unobvious manner.

SUMMARY

The present invention relates generally to a ball valve assembly and a method for assembling a ball valve assembly. While the actual nature of the invention covered herein can only be determined with reference to the claims appended hereto, certain forms of the invention that are characteristic of the preferred embodiments disclosed herein are described briefly as follows.

According to a first aspect of the present invention there is provided a ball valve assembly comprising a housing defining a flow passage therethrough, a valve chamber in said flow passage, a ball valve rotatably disposed in said valve chamber, the ball valve having a bore therethrough and being rotatable about an axis between an open position in which the bore is in fluid communication with the flow passage and a closed position in which the communication is blocked, and a valve stem connected to the ball valve and rotatable so as to move the ball valve between the open and closed positions, characterized in that stem is connected to the ball valve by an end of the valve stem being received in a slot defined in the ball valve, the slot having an open end for entry or exit of the stem from the slot when the ball valve is moved relative to the stem in the direction of the slot during assembly or disassembly.

The arrangement provides for easy assembly of the components of the ball valve assembly. In particular, the design of the ball valve enables the stem to be inserted into the stem bore of the housing first from the inside of the valve housing thereby eliminating the requirement for a supporting bonnet with an anti blow out feature. The ball valve can then be presented to the valve chamber so as to receive the end of the stem in the slot. The end of the valve stem is preferably in the form of a key with an actuating surface for abutment with a corresponding surface on the slot. The actuating surface and the corresponding surface may be substantially flat. The slot is ideally elongate and extends from the open end at a surface of the ball to a location that intersects the axis of rotation of the ball valve. Preferably the stem is connected to the ball valve at the axis of rotation.

In a preferred embodiment stop means is provided to prevent movement of the ball slot relative to the stem. The stop means preferably extends in a direction transverse to the slot and to one side of the stem. In one preferred embodiment it may be received in a transverse bore in at least on side wall of the slot. The stop means may be a pin and may have a threaded engagement with said transverse bore. A transverse bore for the stop means may be provided in each of opposed side walls of the slot. The ball valve is preferably supported for rotation by a trunnion which may be defined on the ball valve and received in a trunnion bearing. The trunnion bearing may be defined in a trunnion support plate which may be separable from the housing. The stem is preferably disposed in a stem bore in the housing, the stem bore extending substantially perpendicular to the flow passage. The stem ideally has a shoulder deemed thereon and the stem bore has a corresponding shoulder defined therein, the shoulders preventing movement of the stem out of the stem bore. The shoulder on the stem may be defined by an annulus formed on the stem. The shoulder in the stem bore may be defined by a counter bore where the stem bore meets the valve chamber.

According to a second aspect of the present invention there is provided a method for assembling a ball valve assembly, the assembly comprising a housing defining a flow passage therethrough and a substantially perpendicular stem bore, a valve chamber in said flow passage, a ball valve rotatably disposed in said valve chamber, the ball valve having a slot with an open end, the method comprising the steps of inserting the stem from the valve chamber into the stem bore and then inserting the ball valve through the flow passage and into the valve chamber, presenting the open end of the slot to an end of the stem and moving the ball valve in a direction substantially parallel to the length of the slot so that the end of the stem passes along the slot.

It is one object of the present invention to provide a more compact ball valve assembly and a method for assembling a ball valve assembly. Further objects, features, advantages, benefits, and aspects of the present invention will become apparent from the drawings and description contained herein.

DESCRIPTION OF THE PREFERRED EMBODIMENTS

Figure 1:
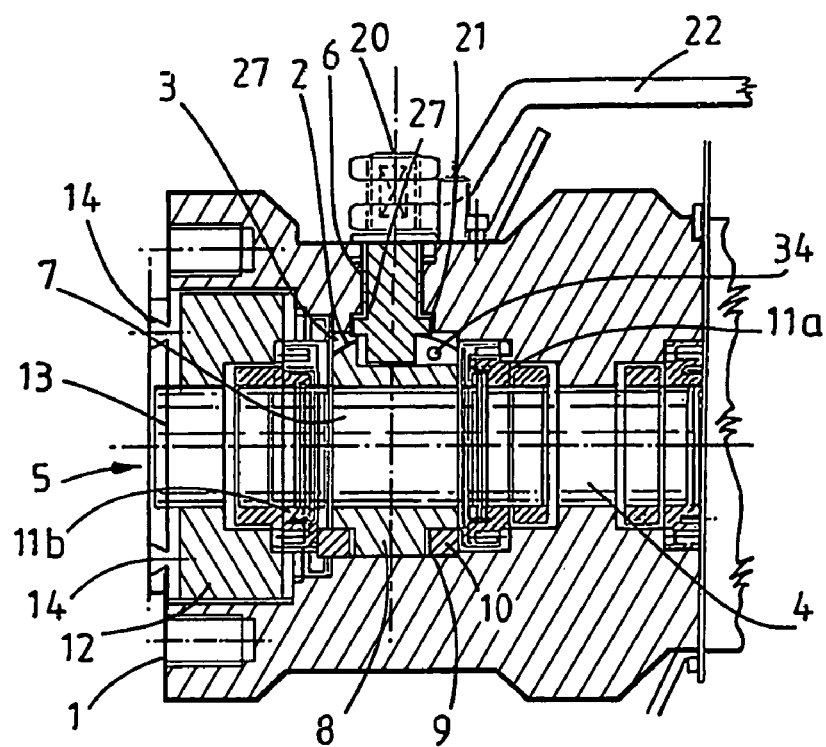
FIG. 1 is a fragmented part-sectioned longitudinal view of a ball valve assembly of the present invention.
Figure 2:
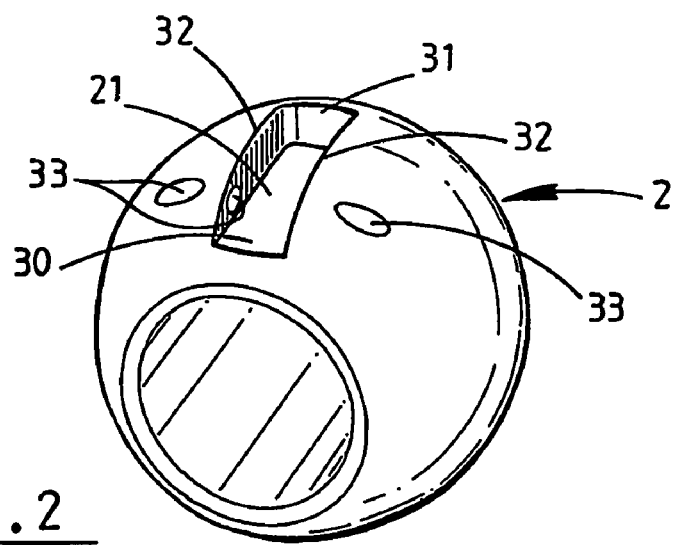
FIG. 2 is a perspective view from above of the ball valve member of the present invention.
Figure 3:
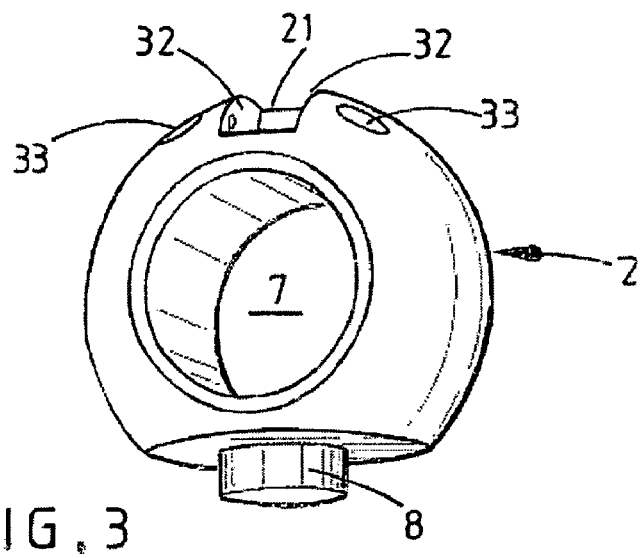
FIG. 3 is a front view of the ball valve member of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated devices, and any further applications of the principles of the invention as illustrated herein, are contemplated as would normally occur to one skilled in the art to which the invention relates.

Referring now to the drawings, the exemplary ball valve assembly shown in FIG. 1 is a double ball valve isolation unit. Only one end of the assembly is depicted and thus only one of ball valves is shown completely. However, it is only necessary to describe one such ball valve assembly to understand the principle of the invention, which applies to single or multiple ball valve assemblies.

The assembly comprises a housing body 1 for connection into a pipeline (not shown) and a ball valve 2 mounted within a valve chamber 3 in the housing 1.

A flow passage 4 extends along the length of the housing 1 for communication with the valve chamber 3 and defines an opening 5 at each end. The body 1 also defines a stem bore 6 that extends perpendicularly to the flow passage 4 and emerges into the valve chamber 3.

The ball valve 2 has a port 7 therethrough for selective registration with the flow passage 4. Rotation of the ball valve in the housing is supported by a trunnion spigot 8 defined on the underside of the valve 2 and which is received in a bearing 9 of a trunnion support plate 10 at the bottom of the valve chamber 3. Annular valve seats 11a, 11b flank the ball valve in the chamber in the usual way.

The housing openings 5 at each end are partially closed by a valve seat retaining member 12 that is generally annular with a central port 13 to define the fluid inlet 13 and outlet (not shown) for the valve assembly. The retaining members 12 have fixing apertures 14 that enable connection to the pipeline and examples are described in more detail in International PCT Patent Application No. WO 2002/29303.

The valve ball 3 is rotatable by means of a stem 20 that passes through the stem bore 6 and is received in a socket 21 defined on the exterior surface of the valve ball diametrically opposite the trunnion spigot 8. The opposite end of the stem projects from the housing 1 and is connected to a handle actuator 22 for rotation of the valve ball between open positions in which the port 7 is in axial register with the flow passage 4, the inlet 13 and outlet, and a closed position in which the ball port 7 is not in communication with the flow passage 4.

Figure 4:
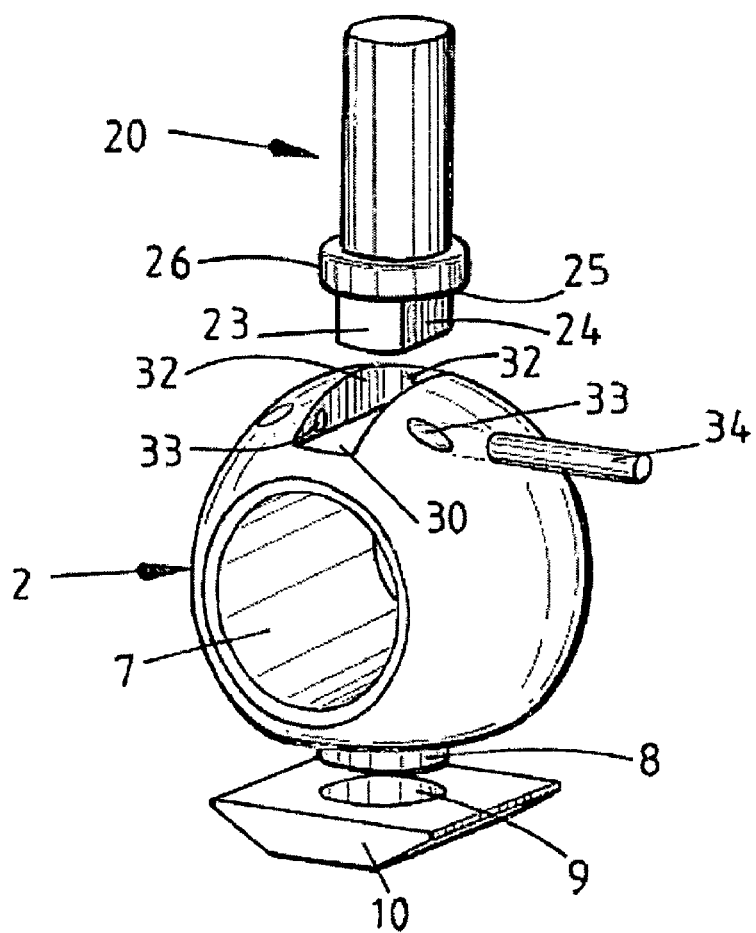
FIG. 4 is a perspective exploded view showing the ball valve member, the trunnion support, stem and pin of the ball valve assembly of FIG. 1.

The stem 20 is generally cylindrical but has a first end that is machined to define a key 23 (see FIG. 4) with a pair of opposed flats 24 for abutment with corresponding flat surfaces on the ball valve socket 21 (described in more detail below). Immediately above the key 23 there is a shoulder 25 defined on an enlarged diameter portion 26 of the stem that serves to retain the stem 20 in the housing 1. The enlarged diameter portion 26 is received in a counter bore 27 defined in the stem bore 6 at the position where it emerges into the valve chamber. The counter bore 27 is carefully dimensioned so as to receive the portion 26 and to abut the shoulder 25 so as to prevent the stem 20 being blown upwardly in the stem bore and out of the housing at high pressures.

The socket 21 on the ball valve 2 is in the form of an elongate slot having an open end 30, a closed end 31 and flat side walls 32. A pair of aligned small transverse bores 33 extend through the side walls 32 adjacent to the open end 30 and emerge at the surface of the ball 2 on each side of the slot 21. The transverse bores 33 are designed to receive a pin 34 that extends across the slot 21 and retains the key 23 of the stem 20 in engagement with the socket 21. One of the transverse bores 33 and one end of the pin 34 may be threaded to provide for a secure engagement.

The valve assembly is assembled in the following manner. First, an inner valve seat 11a is inserted into the valve chamber 3, the stem 20 is then passed into the flow passage 4 and the valve chamber 3 and inserted into the stem bore 6 such that the shoulder 25 is received in the counter bore 27. The ball valve 3 and trunnion support plate 10 are then inserted together into the valve chamber 3 with the open end 30 of the slot 21 in the ball valve aligned to receive the key 23 of the stem 20. When the stem 20 is fully engaged in the socket 20 the ball and the stem are rotated through 90 degrees and the pin 34 inserted into the transverse bores 33 so as to retain the stem 20 in engagement with the ball 3. The other valve seat 11b and the valve seat retainer member 12 are then inserted so as to complete the assembly.

In operation the ball valve is opened or closed by operating the handle 22 so as to rotate the stem 20 and therefore the ball 2 in the bearing 9 of the trunnion support plate 10. When the ball valve is closed the port 7 is out of register with the flow passage 4 and in the event that there is a significant differential pressure across the ball the abutment of the flats 24 on the stem key 23 and the flat side walls 32 of the slot 21 prevent significant lateral movement of the ball in the chamber thus maintaining the ball in a central position. As the ball is rotated between the open and closed positions the pin 34 prevents or restricts any significant movement of the ball 2 from the central position. Once the valve is open, the seats 11a, 11b (which are spring-loaded) and the trunnion support plate 10 hold the ball in the central position.

The present invention provides for a more compact and cheaper ball valve assembly by eliminating the need for a bonnet and other components. It also reduces the number of potential leak paths and requires a lower torque for operation.

It will be appreciated that numerous modifications to the above described design may be made without departing from the scope of the invention as defined in the appended claims. For example the design can be applied equally to a single isolation ball valve as it is for the double ball valve isolation unit described.

What is claimed is:

1. A ball valve assembly comprising a housing defining a flow passage therethrough, a valve chamber in said flow passage, a ball valve rotatably disposed in said valve chamber, the ball valve having a bore therethrough and being rotatable about an axis between an open position in which the bore is in fluid communication with the flow passage and a closed position in which the communication is blocked, and a valve stem connected to the ball valve and rotatable about the axis so as to move the ball valve between the open and closed positions, the stem being connected to the ball valve by an end of the valve stem being received in an elongate slot defined in the ball valve, the elongate slot having opposed side walls and a length that extend in a direction substantially along a direction of the bore extending through the ball valve and having an open end opening in a direction transverse to the axis and the open end laterally spaced from the axis for entry or exit of the stem from the slot when the ball valve is moved relative to the stem in the direction of the slot during assembly or disassembly, characterised in that the assembly further comprises a separate stop member for releasable attachment to the ball valve after receipt of the end of the stem in the slot to prevent exit of the end of the stem from the open end of the slot, the stop member located adjacent the open end of the slot laterally spaced from the axis and laterally offset to one side of the stem.

2. A ball valve assembly according to claim 1, wherein said end of the valve stem is a key with an actuating surface for abutment with a corresponding surface on the slot.

3. A ball valve assembly according to claim 2, wherein the actuating surface and the corresponding surface are substantially flat.

4. A ball valve assembly according to claim 1, wherein the slot is elongate and extends from the open end at a surface of the ball to a location at or near the axis of rotation of the ball valve.

5. A ball valve assembly according to claim 1, wherein the stem is connected to the ball valve at the axis of rotation.

6. A ball valve assembly according to claim 1, wherein the ball valve is supported for rotation by a trunnion.

7. A ball valve assembly according to claim 6, wherein the trunnion is defined on the ball valve and is received in a trunnion bearing.

8. A ball valve assembly according to claim 7, wherein the trunnion bearing is defined in a trunnion support plate.

9. A ball valve assembly according to claim 8, wherein the trunnion support plate is separable from the housing.

10. A ball valve assembly according to claim 1, wherein the stem is disposed in a stem bore in the housing, the stem bore extending substantially perpendicular to the flow passage.

11. A ball valve assembly according to claim 10, wherein the stem has a shoulder defined thereon and the stem bore has a corresponding shoulder defined therein, the shoulders preventing movement of the stem out of the stem bore.

12. A ball valve assembly according to claim 11, wherein the shoulder on the stem is defined by an annulus formed on the stem.

13. A ball valve assembly according to claim 11, wherein the shoulder in the stem bore is defined by a counter bore where the stem bore meets the valve chamber.

14. A ball valve assembly according to claim 1, wherein the stem extends in a direction substantially perpendicular to the length of the slot.

15. A ball valve assembly according to claim 1, wherein the stop member does not pass through the stem.

16. A ball valve assembly comprising a housing defining a flow passage therethrough, a valve chamber in said flow passage, a ball valve rotatably disposed in said valve chamber, the ball valve having a bore therethrough and being rotatable about an axis between an open position in which the bore is in fluid communication with the flow passage and a closed position in which the communication is blocked, and a valve stem connected to the ball valve and rotatable about the axis so as to move the ball valve between the open and closed positions, the stem being connected to the ball valve by an end of the valve stem being received in an elongate slot defined in the ball valve, the elongate slot having opposed side walls and a length that extend in a direction substantially along a direction of the bore extending through the ball valve and having an open end opening in a direction transverse to the axis and the open end laterally spaced from the axis for entry or exit of the stem from the slot when the ball valve is moved relative to the stem in the direction of the slot during assembly or disassembly, characterised in that the assembly further comprises a separate stop means for releasable attachment to the ball valve after receipt of the end of the stem in the slot and for preventing movement of the ball and slot relative to the stem to prevent exit of the end of the stem from the open end of the slot, wherein the stop means extends in a direction transverse to the slot and to one side of the stem.

17. A ball valve assembly according to claim 16, wherein the stop means is received in a transverse bore in at least one side wall of the slot adjacent the open end of the slot laterally spaced from the axis and laterally offset to one side of the stem.

18. A ball valve assembly according to claim 17, wherein the stop means is threadedly engaged with said transverse bore.

19. A ball valve assembly according to claim 16, wherein the stop means is a pin.

20. A ball valve assembly according to claim 17, wherein there is provided a transverse bore in each of the opposed side walls of the slot.

21. A ball valve assembly according to claim 16, wherein the stop means does not pass through the stem.

22. A method for assembling a ball valve assembly, the assembly comprising a housing defining a flow passage therethrough and a substantially perpendicular stem bore, a valve chamber in said flow passage, a ball valve rotatably disposed for rotation about an axis in said valve chamber, the ball valve having a bore therethrough and an elongate slot with an open end opening in a direction transverse to the axis, the elongate slot having opposed side walls and a length that extend in a direction substantially along a direction of the bore extending through the ball valve, the ball valve having a valve stem, the method comprising the steps of inserting the stem from the valve chamber into the stem bore and then inserting the ball valve through the flow passage and into the valve chamber, presenting the open end of the slot to an end of the stem and moving the ball valve in a direction substantially parallel to the length of the slot and transverse to the axis so that the end of the stem passes through the open end and along the length of the slot, characterised in that a separate stop member is provided and the method further comprises inserting the stop member at a location adjacent the open end of the slot after the end of the stem has passed along the slot such that the stop member prevents movement of the stem out of the open end of the slot, the stop member laterally spaced from the axis and laterally offset to one side of the stem.

23. A method according to claim 22, wherein the stop member is inserted into at least one transverse bore.

24. A method according to claim 22, wherein the stop member is inserted so that it extends across the slot.

25. The method according to claim 22, wherein the stop member does not pass through the stem.

* * * * *